United States Patent
Huang et al.

(10) Patent No.: US 11,666,905 B2
(45) Date of Patent: Jun. 6, 2023

(54) TRIBOELECTRIC NANOGENERATOR-BASED BIOCHEMICAL DROPLET REACTION DEVICE AND METHOD

(71) Applicant: SOOCHOW UNIVERSITY, Suzhou (CN)

(72) Inventors: Haibo Huang, Suzhou (CN); Hao Shen, Suzhou (CN); Zhen Wen, Suzhou (CN); Liguo Chen, Suzhou (CN); Hao Lei, Suzhou (CN); Jizhu Liu, Suzhou (CN); Yangjun Wang, Suzhou (CN); Cihai Dai, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/764,968

(22) PCT Filed: Dec. 11, 2020

(86) PCT No.: PCT/CN2020/135531
§ 371 (c)(1),
(2) Date: Mar. 29, 2022

(87) PCT Pub. No.: WO2021/244002
PCT Pub. Date: Dec. 9, 2021

(65) Prior Publication Data
US 2022/0355293 A1  Nov. 10, 2022

(30) Foreign Application Priority Data
Jun. 2, 2020  (CN) .......................... 202010490287.6

(51) Int. Cl.
*B01L 3/00* (2006.01)
*H02N 1/04* (2006.01)
*B82Y 30/00* (2011.01)

(52) U.S. Cl.
CPC ......... *B01L 3/502707* (2013.01); *B82Y 30/00* (2013.01); *H02N 1/04* (2013.01); *B01L 2200/027* (2013.01)

(58) Field of Classification Search
CPC ...... B01L 3/502707; H02N 1/04; B82Y 30/00
See application file for complete search history.

(56) References Cited

U.S. PATENT DOCUMENTS

2015/0001993 A1   1/2015  Park et al.

FOREIGN PATENT DOCUMENTS

| CN | 102614823 A | 8/2012 |
| CN | 103752357 A | 4/2014 |

(Continued)

*Primary Examiner* — Brian R Gordon
*Assistant Examiner* — Dwan A Gerido
(74) *Attorney, Agent, or Firm* — SZDC Law P.C.

(57) ABSTRACT

Disclosed is a triboelectric nanogenerator-based biochemical droplet reaction device, which includes a reaction generating part and a power generation part. The power generation part includes a triboelectric component and a rectifier circuit. The triboelectric component includes a drive electrode, a substrate, a first friction electrode, a first friction material, a second friction material, and a second friction electrode arranged in sequence from top to bottom. A gap exists between the first friction material and the second friction material. The first friction electrode is connected to the first friction material. The second friction electrode is connected to the second friction material. The drive electrode, the first friction electrode, and the second friction electrode are all connected to the rectifier circuit. Also disclosed is a reaction method.

1 Claim, 6 Drawing Sheets

(56) References Cited

FOREIGN PATENT DOCUMENTS

| CN | 107961420 | A | 4/2018 |
| CN | 109248719 | A | 1/2019 |
| CN | 209271490 | U | 8/2019 |
| CN | 111604097 | A | 9/2020 |

TRIBOELECTRIC NANOGENERATOR-BASED BIOCHEMICAL DROPLET REACTION DEVICE AND METHOD

This application is the National Stage Application of PCT/CN2020/135531, filed on Dec. 11, 2020, which claims priority to Chinese Patent Application No. 202010490287.6, filed on Jun. 2, 2020, which is incorporated by reference for all purposes as if fully set forth herein.

TECHNICAL FIELD

The present invention relates to the technical field of micro-droplet control, and in particular to a triboelectric nanogenerator-based biochemical droplet reaction device and method.

BACKGROUND

With the rapid development of biochemical technology, the demand for improvement and optimization of its research equipment is also increasing. The development of digital microfluidics provides new ideas for biochemical reactions. The first one that is applied is continuous flow microfluidic equipment. Reagents to be reacted are pumped into a digital microfluidic chip through air pumps, valves and other devices from different inlets, converge and react within the chip. However, this method has certain drawbacks. The reactants and side reactants sometimes produce solids, blocking the pipeline and easily causing cross-contamination. In order to solve the above problems, a method of using a droplet as a closed reaction space is proposed. However, for organic solvents, the dielectric wetting effect cannot sufficiently change the surface tension to drive the droplet. This makes EWOD impose a natural limit to the drive of organic solvents. Therefore, a carrier droplet is needed that can respond to the EWOD effect and can also wrap the organic solvent to be reacted. At the same time, organic reactions often require many steps. Therefore, when using the EWOD effect to fabricate microfluidic chips, a large number of electrodes and complex control circuits are required. The more complex the reaction process, the more difficult the fabrication of the chip.

The invention of triboelectric nanogenerators (TENG) brings new solutions to the simplification and miniaturization of electronic devices. The triboelectric nanogenerator can convert the common mechanical energy in our lives into electrical energy, which can be used as a generator for electronic devices or power systems. Its characteristics of high voltage and low current are very suitable for the needs of EWOD to drive droplets. Here, TENG can provide drive power and control signals for various electromechanical systems, and can be used as a bridge to realize human-machine interaction and made as a wearable movable generator, which not only reduces the demand for electrodes, but also makes the control of the droplets more flexible, getting rid of the limitation of using traditional microfluidic chips one by one. Therefore, the triboelectric nanogenerator has great application prospects in the field of microfluidics.

SUMMARY OF THE INVENTION

In view of the shortcomings of the prior art, an object of the present invention is to provide a triboelectric nanogenerator-based biochemical droplet reaction device and method.

In order to achieve the above object, the technical solution according to an embodiment of the present invention is as follows.

A triboelectric nanogenerator-based biochemical droplet reaction device, including a reaction generating part and a power generation part, wherein the power generation part includes a triboelectric component and a rectifier circuit, the triboelectric component includes a drive electrode, a substrate, a first friction electrode, a first friction material, a second friction material, and a second friction electrode arranged in sequence from top to bottom, a gap exists between the first friction material and the second friction material, the first friction electrode is connected to the first friction material, the second friction electrode is connected to the second friction material, and the drive electrode, the first friction electrode, and the second friction electrode are all connected to the rectifier circuit.

As a further improvement of the present invention, the rectifier circuit is a bridge rectifier circuit, a first input and a second input of the bridge rectifier circuit are respectively connected to the first friction electrode and the second friction electrode and are both connected to the drive electrode, a first switch is connected between the drive electrode and the first friction electrode, and a second switch is connected between the drive electrode and the second friction electrode.

As a further improvement of the present invention, a finger cuff is installed on the second friction electrode.

As a further improvement of the present invention, contact surfaces of the first friction material and the second friction material opposite to each other are respectively a first contact surface and a second contact surface, and a plurality of protrusions are formed on the first contact surface and the second contact surface.

As a further improvement of the present invention, the protrusions are tetrahedrons.

As a further improvement of the present invention, the protrusions are processed by photolithography technology.

As a further improvement of the present invention, the substrate is a silicon plate.

As a further improvement of the present invention, the reaction generating part includes a reaction platform with a hollow interior and at least one droplet inlet and outlet formed at an upper end of the reaction platform and communicated with the interior of the reaction platform.

A triboelectric nanogenerator-based biochemical droplet reaction method, including the steps of:

(1) dripping a first carrier droplet into a reaction platform;

(2) moving a power generation part below the first carrier droplet, and pressing a first friction material and a second friction material back and forth to charge a drive electrode;

(3) moving the power generation part, such that the first carrier droplet moves with the drive electrode;

(4) dripping a first droplet to be reacted into the reaction platform, such that the first carrier droplet is combined with the first droplet to be reacted and wraps the first droplet to be reacted;

(5) repeating steps (1) to (4), such that a second carrier droplet wraps a second droplet to be reacted;

(6) moving the power generation part, such that the first carrier droplet is mixed with the second carrier droplet and the first droplets to be reacted contacts the second droplet to be reacted; and (7) closing a first switch and a second switch, such that the first droplet to be reacted and the second droplet to be reacted are mixed and reacted.

The beneficial effects of the present invention are as follows.

(1) A triboelectric nanogenerator is adopted to generate electricity to drive a droplet, replacing the traditional motor, simplifying the structure of the device and making the device more portable.
(2) By making electrodes and nanogenerators into mobile devices, the manufacturing of microfluidic devices can be simplified, and the control of droplet movement can be made more flexible.
(3) The use of a droplet-based reaction can prevent cross-mixing and cross-contamination, and also avoid pipeline blockage caused by solid reactants and side reactants. Each droplet acts as a batch reactor, which shows that a multi-step reaction is feasible and solvent exchange and combinatorial synthesis may be involved.
(4) By providing a carrier droplet to wrap an organic solvent, the organic solvent can move with the movable electrode, greatly increasing the applicability of the device.
(5) By providing a bridge rectifier circuit to rectify alternating current generated by induced electricity into direct current, the droplet can be controlled stably. After the droplets to be reacted are fused, the bridge rectifier is turned off to make the electric field become an alternating electric field. The droplet begins to oscillate under the action of the alternating electric field, and fluid flow is generated in the droplet, accelerating the fusion and reaction of the solution to be reacted.
(6) By processing the surface of the friction material into tetrahedral protrusions by photolithography, the contact area can be increased and the induced voltage can be increased.
(7) The reaction platform is made of PDMS material, which has good biocompatibility and hydrophobicity, and is suitable for the progress of biochemical reactions.

BRIEF DESCRIPTION OF THE DRAWINGS

In order to illustrate the technical solutions in the embodiments of the present invention or the prior art more clearly, the following will briefly introduce the drawings that need to be used in the description of the embodiments or the prior art. Obviously, the drawings in the following description are only some embodiments described in the present invention. For those of ordinary skill in the art, other drawings may be obtained based on these drawings without creative work.

In the figure: 10, reaction generating part, 12, power generation part, 14, drive electrode, 16, substrate, 18, first friction electrode, 20, first friction material, 22, second friction material, 24, second friction electrode, 26, bridge rectifier circuit, 28, first switch, 30, second switch, 32, finger cuff, 34, first contact surface, 36, second contact surface, 38, protrusion, 40, reaction platform, 42, droplet inlet, 44, droplet outlet.

DETAILED DESCRIPTION

In order to enable those skilled in the art to better understand the technical solutions of the present invention, the technical solutions in the embodiments of the present invention will be described clearly and completely in conjunction with the accompanying drawings in the embodiments of the present invention. Obviously, the described embodiments are some embodiments of the present invention, not all the embodiments. Based on the embodiments of the present invention, all other embodiments obtained by those skilled in the art without creative work shall fall within the scope of protection of the present invention.

Figure 1:
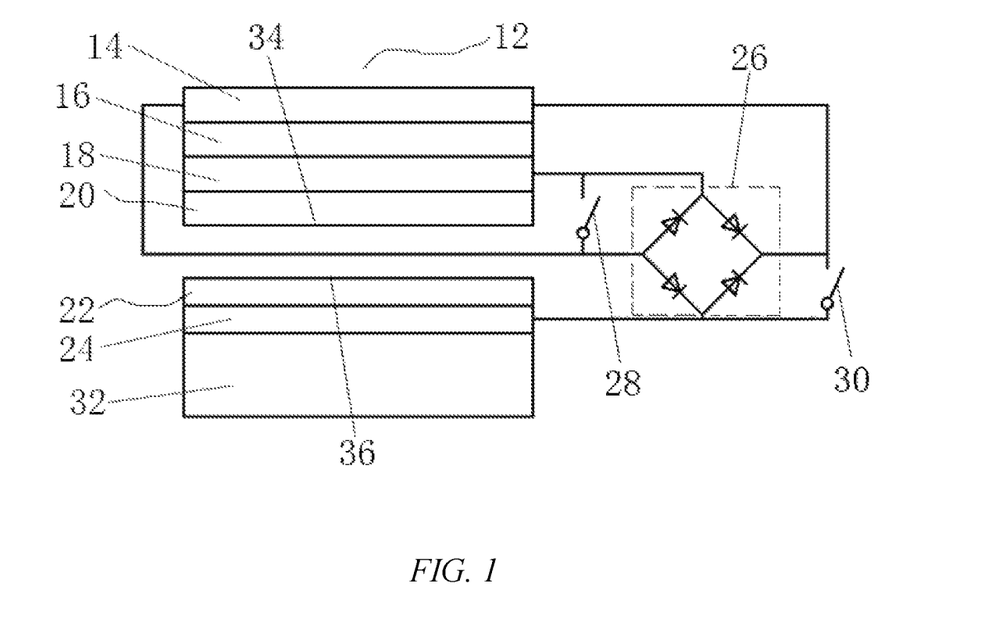
FIG. 1 is a schematic diagram of a structure of a power generation part according to a preferred embodiment of the present invention.
Figure 2:
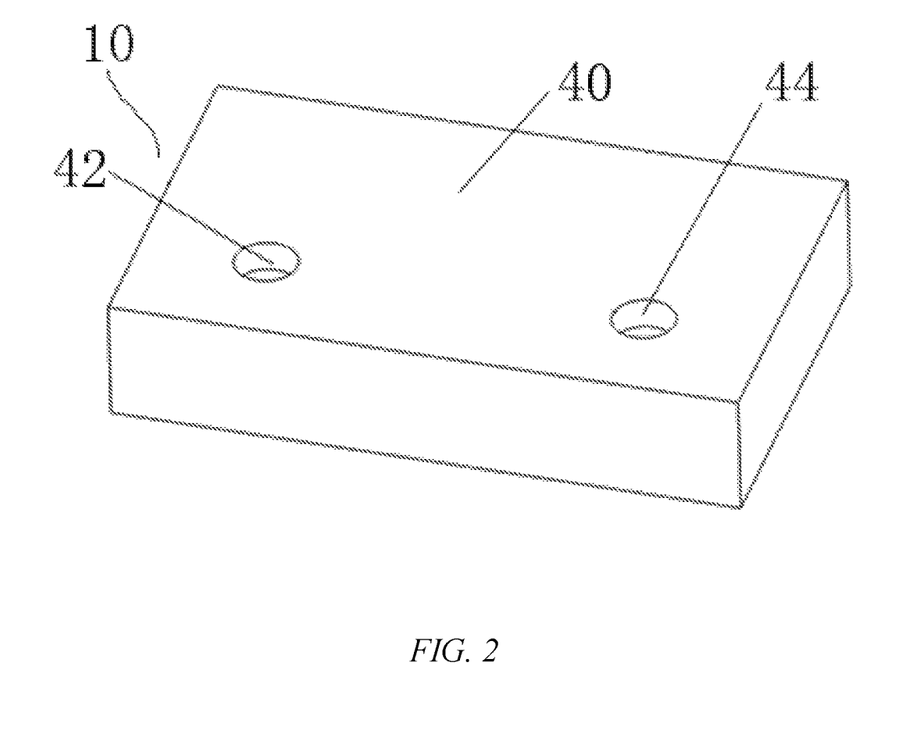
FIG. 2 is a schematic diagram of a structure of a reaction generating part according to a preferred embodiment of the present invention.

As shown in FIGS. 1 and 2, a triboelectric nanogenerator-based biochemical droplet reaction device includes a reaction generating part 10 and a power generation part 12. The power generation part 12 includes a triboelectric component and a rectifier circuit. The triboelectric component includes a drive electrode 14, a substrate 16, a first friction electrode 18, a first friction material 20, a second friction material 22, and a second friction electrode 24 arranged in sequence from top to bottom. The substrate 16 is configured to receive the drive electrode 14 and may realize a gap between the drive electrode 14 and the first friction material 20 and the second friction material 22. The first friction electrode 18 is connected to the first friction material 20. The second friction electrode 24 is connected to the second friction material 22. The drive electrode 14, the friction electrode 18 and the second friction electrode 24 are all connected to the rectifier circuit.

In a preferred embodiment of the present invention, the rectifier circuit is a bridge rectifier circuit 26. A first input and a second input of the bridge rectifier circuit 26 are respectively connected to the first friction electrode 18 and the second friction electrode 24 and are both connected to the drive electrode 14. A first switch 28 is connected between the drive electrode 14 and the first friction electrode 18. A second switch 30 is connected between the drive electrode 14 and the second friction electrode 24.

In order to facilitate the movement of the power generation part 12, in a preferred embodiment of the present invention, a finger cuff 32 is installed on the second friction electrode 24.

Figure 3:
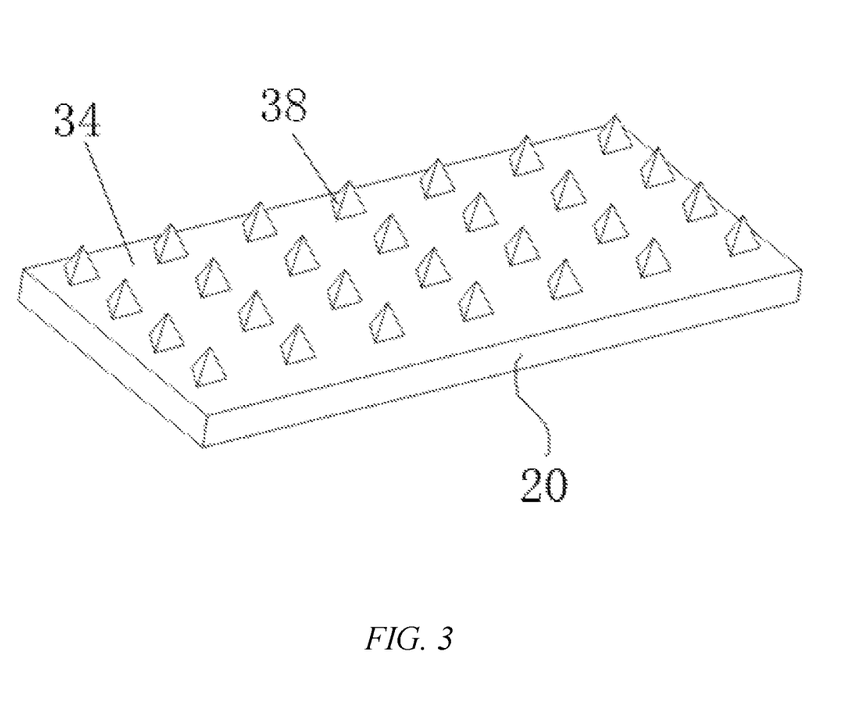
FIG. 3 is a schematic diagram of a surface of a first friction material according to the present invention.

As shown in FIGS. 1 and 3, in a preferred embodiment of the present invention, contact surfaces of the first friction material 20 and the second friction material 22 opposite to each other are a first contact surface 34 and a second contact surface 36, respectively. A plurality of protrusions 38 are formed on the first contact surface 34 and the second contact surface 36 to increase a contact area between the first contact surface 34 and the second contact surface 36 and increase an induced voltage.

In order to further increase the contact area, in a preferred embodiment of the present invention, the protrusions 38 are tetrahedrons.

In a preferred embodiment of the present invention, the protrusions 38 are processed by photolithography technology, which is easy to process and has good processing quality.

In a preferred embodiment of the present invention, the substrate 16 is a silicon plate.

In a preferred embodiment of the present invention, the reaction generating part 10 includes a reaction platform 40 with a hollow interior and at least one droplet inlet and outlet formed at an upper end of the reaction platform 40 and communicated with the interior of the reaction platform 40. Specifically, the reaction platform 40 is a closed box with a hollow interior. The number of the droplet inlets and outlets is two, which are respectively a droplet inlet 42 and a droplet outlet 44. In a further preferred embodiment of the present invention, the droplet inlet 42 and the droplet outlet 44 are circular. In a preferred embodiment of the present invention, the reaction platform 40 is made of PDMS material, but it is not limited to PDMS material, and may also be made of PET material.

Under the action of an electric field force, a droplet will produce the a wetting effect, which may be expressed by a Young-Lippmann equation (1):

$$\cos\theta(V)\cos\theta_0 + \frac{\varepsilon_0 \varepsilon_d}{2\gamma_{ld} t} V^2 \qquad (1)$$

where $\theta_0$ is a contact angle between the droplet and a solid surface when the voltage is 0, $\theta(V)$ represents the contact angle between the droplet and the solid surface when the voltage is V, $\varepsilon_0$ is a permittivity in vacuum, $\varepsilon_d$ is a relative permittivity, $\gamma$ld is a gas-liquid surface tension, t is the thickness of the dielectric layer, and V is the applied voltage.

Figure 4:
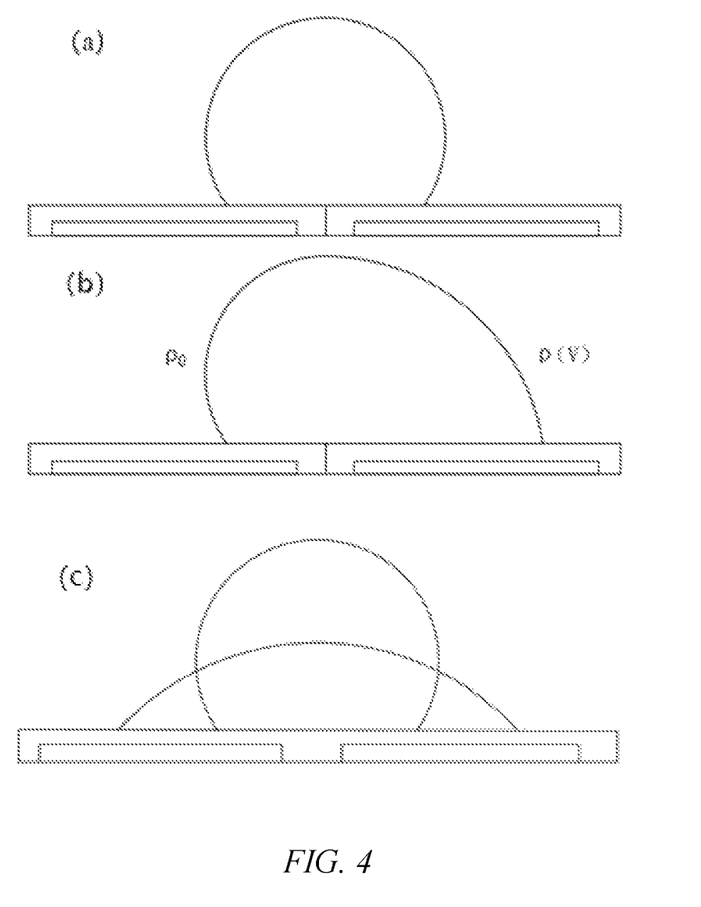
FIG. 4 is a drive principle diagram of dielectric wetting according to a preferred embodiment of the present invention.

FIG. 4 is a drive principle diagram of dielectric wetting. When an electrode under a droplet is energized, a corresponding contact angle changes accordingly, and the shape of the droplet is also deformed. An initial state of the droplet is shown in FIG. 4(*a*). When a right electrode is energized and a left electrode is not energized, the state of the droplet is shown in FIG. 4(*b*). A left contact angle of the droplet is still $\theta_0$, a radius of curvature of the droplet profile is $\rho_0$, a right contact angle is $\theta(V)$, and the radius of curvature of the droplet profile is p(V). According to a relationship (2) between the pressure difference and the radius of curvature, a Laplace pressure difference inside the droplet may be calculated, that is, a force that drives the droplet.

$$\Delta P = \gamma_{ld}\left(\frac{1}{\rho_0} + \frac{1}{\rho(V)}\right) \qquad (2)$$

When the electrode under the droplet is connected to alternating current, the corresponding contact angle will change continuously with the alternating voltage in the two states shown in FIG. 4(*c*). At the same time, fluid flow will also be formed in the interior of the droplet, accelerating the fusion and reaction of solvents.

Figure 5:
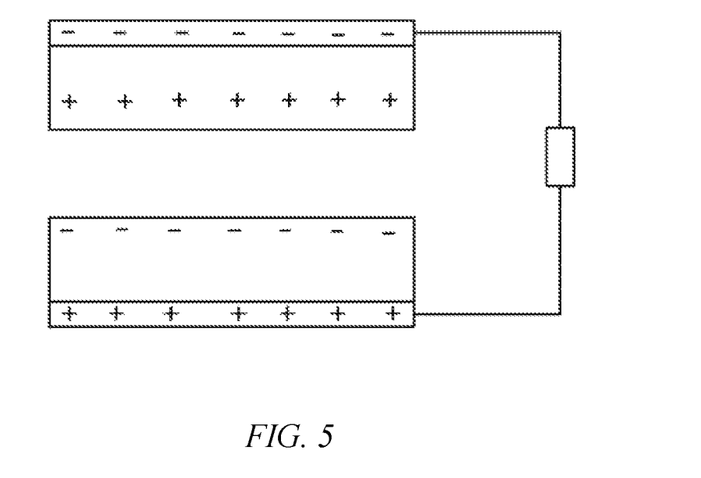
FIG. 5 is a principle diagram of power generation according to a preferred embodiment of the present invention.

The power generation principle of the triboelectric nanogenerator is shown in FIG. 5. When two friction materials with different electron-binding capabilities are in contact, the material with strong electron-binding ability will be negatively charged, and the material with weak electron-binding ability will be positively charged. After repeated contact, one friction material reaches saturation first, and the other material is still gaining/losing electrons. In this case, electrodes connected thereto will transfer electrons. Then, a potential difference is formed between the two electrodes.

A biochemical droplet reaction method of the present invention is introduced hereinafter. The method is applicable to the above device and includes the following steps.

(1) A first carrier droplet 46 is dripped into the reaction platform 40.

(2) The power generation part 12 is moved below the first carrier droplet 46, and the first friction material 20 and the second friction material 22 are pressed back and forth to charge the drive electrode 14.

(3) The power generation part 12 is moved, such that the first carrier droplet 46 moves with the drive electrode 14.

(4) A first droplet to be reacted 48 is dripped into the reaction platform 40, such that the first carrier droplet 46 is combined with the first droplet to be reacted 48 and wraps the first droplet to be reacted 48.

(5) The steps (1) to (4) are repeated, such that a second carrier droplet 50 wraps a second droplet to be reacted 52.

(6) The power generation part 12 is moved, such that the first carrier droplet 46 is mixed with the second carrier droplet 50, and the first droplet to be reacted 48 contacts the second droplet 52 to be reacted.

(7) The first switch 28 and the second switch 30 are closed, such that the first droplet to be reacted 48 and the second droplet to be reacted 52 are mixed and reacted.

In order to further illustrate the biochemical droplet reaction method of the present invention, a preferred embodiment includes the following steps.

(1) The first carrier droplet 46 is dripped into the interior of the reaction platform 40 through the droplet inlet 42.

Figure 6A:
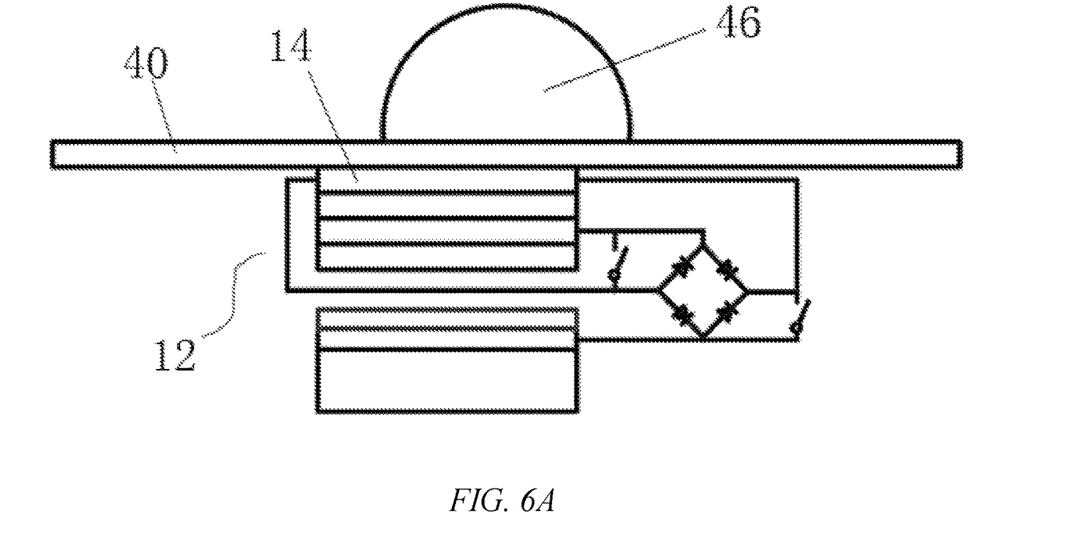
FIGS. 6A-6E are operation principle diagrams of according to a preferred embodiment of the present invention.

(2) The power generation part 12 is moved below the first carrier droplet 46 with a finger placed in the finger cuff 32, as shown in FIG. 6A. The first friction material 20 and the second friction material 22 are pressed back and forth. The first friction material 20 and the second friction material 22 repeatedly contact with each other to induce electricity, such that a potential difference is generated between the first friction electrode 18 and the second friction electrode 24 to charge the drive electrode 14 and generate an electric field.

Figure 6B:
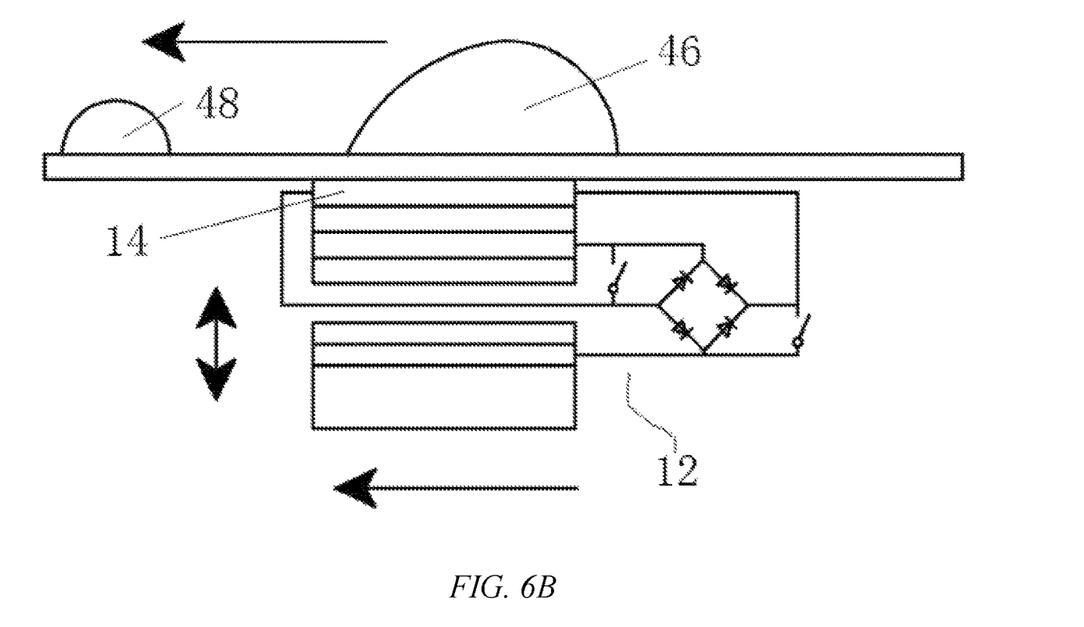

(3) As shown in FIG. 6B, the first carrier droplet 46 produces a dielectric wetting effect under the action of the electric field, the contact angle is reduced, and the power generation part 12 is moved, such that the first carrier droplet 46 moves with the drive electrode 14.

Figure 6C:
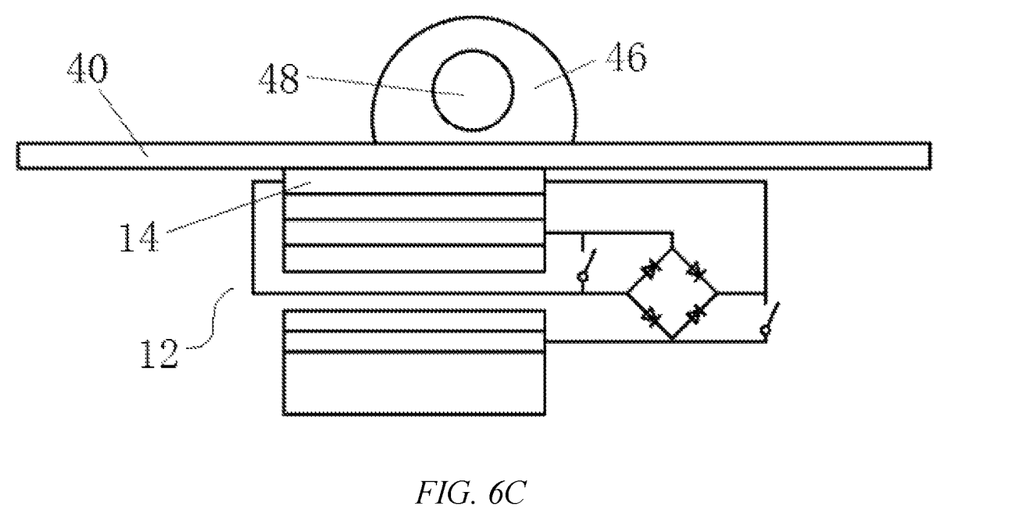

(4) The first droplet to be reacted 48 is dripped into the reaction platform 40 through the droplet inlet 42. The power generation part 12 is moved, such that the first carrier droplet 46 moves toward the first droplet to be reacted 48 to combined with the first droplet to be reacted 48 and wrap the first droplet to be reacted 48, as shown in FIG. 6C. The power generation part 12 is moved, such that the first droplet to be reacted 48 moves away with the first carrier droplet 46.

(5) The second carrier droplet 50 is moved into the interior of the reaction platform 40 through the droplet inlet 42. The power generation part 12 is moved below the second carrier droplet 50 with the finger placed in the finger cuff 32. The first friction material 20 and the second friction material 22 are pressed back and forth. The first friction material 20 and the second friction material 22 repeatedly contact with each other to induce electricity, such that a potential difference is generated between the first friction electrode 18 and the second friction electrode 24 to charge the drive electrode 14 and generate an electric field. The second carrier droplet 50 produces a dielectric wetting effect under the action of the electric field. The contact angle is reduced. The power generation part 12 is moved, such that the second carrier droplet 50 moves with the drive electrode 14. The second droplet 52 to be reacted is dripped into the reaction platform 40 through the droplet inlet 42. The power generation part 12 is moved, such that the second carrier droplet 50 moves toward the second droplet to be reacted 52 to be combined with the second droplet to be reacted 52 and wrap the second droplet 52 to be reacted.

Figure 6D:
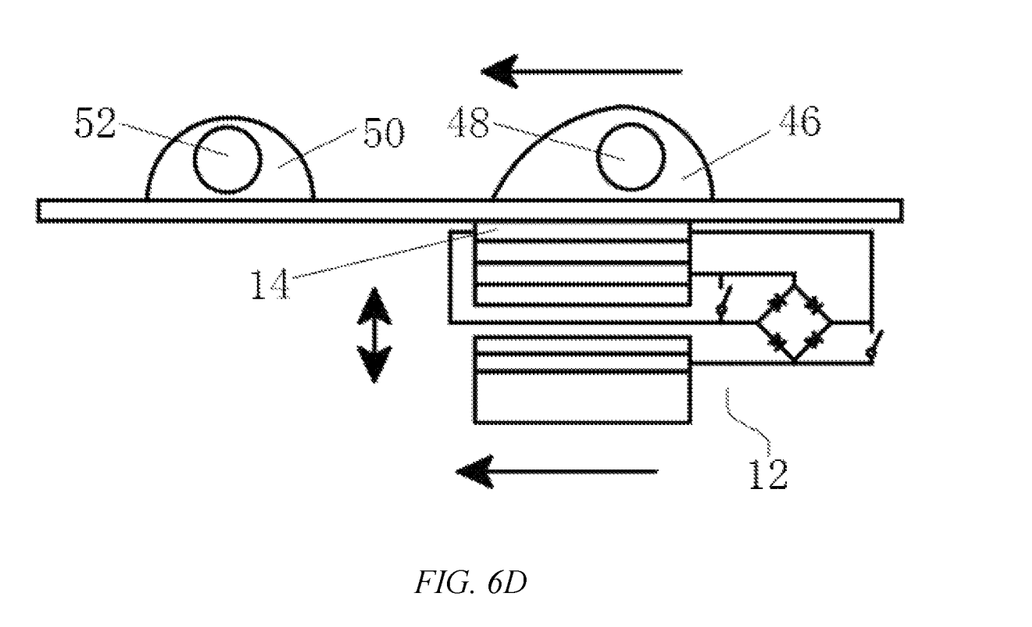
Figure 6E:
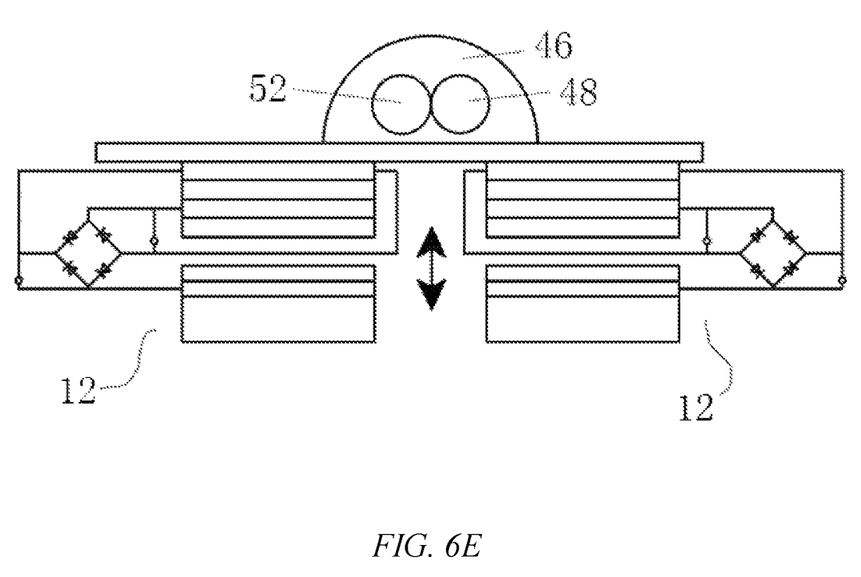

(6) As shown in FIG. 6D, the power generation part 12 is moved, such that the first carrier droplet 46 moves toward and mixes with the second carrier droplet 50, and the first droplet to be reacted 48 contacts the second droplet 52 to be reacted, as shown in FIG. 6E. Only the first carrier droplet 46 is shown in the figure. The second carrier droplet 50 is not shown due to being mixed with the first carrier droplet 46.

(7) The first switch 28 and the second switch 30 are closed, such that an alternating electric field is generated on the drive electrode 14, as shown in FIG. 5. The first carrier droplet 46 and the second carrier droplet 50 oscillate under the action of the alternating electric field, as shown in FIG. 4(c), accelerating the mixing and reaction of the first droplet to be reacted 48 and the second droplet to be reacted 52.

(8) According to the needs of biochemical reaction, the steps (1)-(7) are repeated, and all reactants are dripped into the reaction platform 40 to react.

(9) The two power generation parts 12 are placed on two sides of the first carrier droplet 46 respectively. The first friction material 20 and the second friction material 22 are pressed back and forth. At the same time, the two power generation parts 12 are moved slowly to the two sides to move away from each other, dividing the reaction product into two same parts to complete the separation operation of the reaction product.

(10) The power generation part 12 is moved, such that the first carrier droplet 46 and the reaction product are moved to the droplet outlet 44. The reaction product is sucked out of the first carrier droplet 46 with a pipette, and the reaction is completed.

For those skilled in the art, it is obvious that the present invention is not limited to the details of the above exemplary embodiments, and the present invention can be implemented in other specific forms without departing from the spirit or basic characteristics of the present invention. Therefore, from any point of view, the embodiments should be regarded as exemplary and non-limiting. The scope of the present invention is defined by the appended claims rather than the above description, and therefore all changes falling into the meaning and scope of the equivalent elements of the claims are included in the present invention. Any reference numerals in the claims should not be regarded as limiting the claims in question.

In addition, it should be understood that although the description is illustrated with implementations, not each implementation only includes an independent technical solution. This narration of the description is only for clarity, and those skilled in the art should regard the description as a whole. The technical solutions in the various embodiments can also be appropriately combined to form other implementations that can be understood by those skilled in the art.

What is claimed is:

1. A triboelectric nanogenerator-based biochemical droplet reaction method, comprising the steps of:
    (0) providing a triboelectric nanogenerator-based biochemical droplet reaction device that comprises a reaction generating part and a power generation part, wherein
    the reaction generating part comprises a reaction platform with a hollow interior;
    the power generation part comprises a triboelectric component and a rectifier circuit;
    the triboelectric component comprises a drive electrode, a substrate, a first friction electrode, a first friction material, a second friction material, and a second friction electrode arranged in sequence from top to bottom;
    the rectifier circuit is a bridge rectifier circuit, a first input and a second input of the bridge rectifier circuit are connected to the first friction electrode and the second friction electrode, respectively, wherein the first friction electrode and the second friction electrode are connected to the drive electrode, a first switch is connected between the drive electrode and the first friction electrode, and a second switch is connected between the drive electrode and the second friction electrode;
    (1) dripping a first carrier droplet into the reaction platform;
    (2) moving the power generation part below the first carrier droplet, and pressing the first friction material against the second friction material to charge the drive electrode;
    (3) moving the power generation part, such that the first carrier droplet moves with the drive electrode;
    (4) dripping a first droplet to be reacted into the reaction platform, such that the first carrier droplet is combined with the first droplet to be reacted;
    (5) repeating steps (1) to (4) such that a second carrier droplet is combined with a second droplet to be reacted;
    (6) moving the power generation part, such that the first carrier droplet is mixed with the second carrier droplet and the first droplet to be reacted contacts the second droplet to be reacted; and
    (7) closing the first switch and the second switch, such that the first droplet to be reacted and the second droplet to be reacted are mixed and reacted.

* * * * *